US009105184B2

(12) United States Patent
Stefani et al.

(10) Patent No.: US 9,105,184 B2
(45) Date of Patent: *Aug. 11, 2015

(54) SYSTEMS AND METHODS FOR REAL-TIME DATA COMMUNICATIONS AND MESSAGING WITH OPERATORS OF SMALL UNMANNED AIRCRAFT SYSTEMS (SUAS)

(71) Applicant: ARINC Incorporated, Annapolis, MD (US)

(72) Inventors: Rolf Stefani, West River, MD (US); Ronald Carl Hawkins, Davidsonville, MD (US)

(73) Assignee: ARINC Incorporated, Annapolis, MD (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/792,259

(22) Filed: Mar. 11, 2013

(65) Prior Publication Data
US 2015/0170524 A1    Jun. 18, 2015

(51) Int. Cl.
*G01C 21/00* (2006.01)
*G08G 5/00* (2006.01)
*H04W 4/12* (2009.01)

(52) U.S. Cl.
CPC .............. *G08G 5/0013* (2013.01); *G08G 5/003* (2013.01); *G08G 5/0026* (2013.01); *H04W 4/12* (2013.01); *G01C 21/00* (2013.01)

(58) Field of Classification Search
CPC ....... G01C 21/00; G01S 7/003; G05D 1/0011; G08G 5/00
USPC .............. 701/3, 120, 301, 484, 487, 517, 519
See application file for complete search history.

(56) References Cited

U.S. PATENT DOCUMENTS

| | | | |
|---|---|---|---|
| 8,886,459 B2 * | 11/2014 | Stefani et al. | 701/519 |
| 2009/0248287 A1 | 10/2009 | Limbaugh et al. | |
| 2010/0066604 A1 | 3/2010 | Limbaugh et al. | |

* cited by examiner

*Primary Examiner* — Gertrude Arthur Jeanglaude
(74) *Attorney, Agent, or Firm* — Ronald E. Prass, Jr.; Prass LLP

(57) ABSTRACT

A system and method are provided to support safe integration of small unmanned aircraft systems (sUASs) into the National Airspace Structure in the United States. Substantially real-time data communication provides interested parties with an ability to communicate directly with an operator of the sUAS during system operations. Individual interactive user interfaces are used to implement two way text-like messaging directly with the sUAS control console to enhance safety and reduce conflicts with operations of the sUAS. When an instance arises in which an air traffic controller needs to advise an sUAS operator regarding an unauthorized sUAS mission or a requirement to keep an sUAS clear of a specific block of airspace or specific geographic location due to an immediate, emergent and/or unforeseen event, a means is provided by which to more effectively and more quickly communicate directly with the sUAS operator.

23 Claims, 4 Drawing Sheets

SYSTEMS AND METHODS FOR REAL-TIME DATA COMMUNICATIONS AND MESSAGING WITH OPERATORS OF SMALL UNMANNED AIRCRAFT SYSTEMS (SUAS)

This application is related to U.S. Pat. No. 8,886,459, entitled "SYSTEMS AND METHODS FOR SMALL UNMANNED AIRCRAFT SYSTEMS (sUAS) TACTICAL TRACKING AND MISSION DATA ACQUISITION," which issued on Nov. 11, 2014 on U.S. patent application Ser. No. 13/792,255, filed on a same day as this application, Mar. 11, 2013, the disclosure of which is hereby incorporated by reference herein in its entirety.

BACKGROUND

1. Field of the Disclosed Embodiments

This disclosure relates to systems and methods for implementing substantially real-time data communications and text messaging to provide interested parties with an ability to more effectively communicate with an operator of a Small Unmanned Aircraft System (sUAS) during system operations.

2. Related Art

Unmanned aerial vehicles (UAVs), as that term may be broadly interpreted, have existed in many different forms since the earliest days of flight. The earliest implementations involved the use of balloons, for example, for battle area reconnaissance and surveillance. This disclosure will use the term "Unmanned Aircraft Systems (UAS(s))" to refer to a particular class of UAVs that excludes, for example, missiles, unmanned rockets and weather and/or reconnaissance balloons. UASs are that broad class of UAVs, often commonly referred to as drones and/or remotely piloted vehicles (RPVs) that are differentiated from other UAVs, such as those enumerated above, because the UAS platforms are capable of controlled flight from launch, through in-flight operations, to recovery and/or landing in a manner similar to a conventional piloted airplane or helicopter. The control schemes for these UASs may include real-time or near-real-time control of the flight profile by an operator at a remote control console in constant communication with a particular UAS. Alternatively, the control schemes for these UASs may include execution of preplanned and preprogrammed flight plans, which are autonomously executed by a particular UAS. Depending on a sophistication of the UAS, the control scheme may include an integration of both of the above-discussed control schemes such that a single "flight" may include periods of remote operator control and periods of preprogrammed control.

In early implementations, UASs tended to be small aerial vehicles with significant payload size, weight and power (SWAP) limitations. Based on very strict SWAP constraints, the capabilities of early UASs were limited and heavily dependent on technology miniaturization. These UASs saw early operational deployment for use by, for example, militaries worldwide to provide, among other missions, battle area reconnaissance and surveillance, and spoofing of adversary threat weapons systems when augmented with radar reflectors, for example, to act as decoys. The payload constraints were a significant limiting factor in the deployment of the earliest UASs for these and other military uses. Nonetheless, the popularity and efficacy of these systems on the battlefield were readily recognized. Missions could be undertaken that did not put aircrew in unnecessarily dangerous situations. Low cost added to the operational employment advantage for military-operated UASs in that these platforms were more readily expendable than other assets.

A desire to expand the role of UASs in support of military operations led to a requirement to develop UASs with increased payload capacity. Increased payload capacity had a number of advantages. First, some portion of an additional payload capacity could be dedicated to the carriage of additional fuel to extend ranges, and potential loiter times, for the systems in-flight. Second, some portion of an additional payload capacity could be dedicated to the carriage of a broader array of sensors to support expanded mission requirements, particularly sensors of all types that did not need to be specifically modified or miniaturized to be accommodated by the UAS. Third, some portion of an additional payload capacity could be dedicated to the carriage of ordnance carriage for delivery on, and use against, targets of varying descriptions.

Having proved their usefulness on the modern battlefield, employment of UAS platforms and the associated technology was studied for fielding in a broader array of operational scenarios far beyond military-only use. Many commercial entities and law enforcement agencies began developing noting operational requirements that could be filled through adaptive use of UAS technology. A focus of the development efforts for UAS platforms returned to exploring operation of smaller, more economical UAS platforms. Several manufacturers have worked with customer entities and agencies to develop, test and manufacture small UAS (sUAS) platforms, which are often lightweight, low cost aerial platforms that may be remotely piloted by an sUAS operator at a control and communication console in fairly close proximity to, often visual sight of, the sUAS in operation. To date, sUAS platforms have been limitedly deployed in support of law enforcement and other agency or individual surveillance requirements. sUAS platforms play an increasing role in many public service and public support missions, which include, but are not limited to, border surveillance, wildlife surveys, military training, weather monitoring, fire detection and monitoring, and myriad local law enforcement surveillance support missions.

A challenge to increasingly expanded employment of UAS platforms generally in many domestic, non-military scenarios, particularly in the United States, stems from platforms not having aircrew onboard that are able (1) to detect other close and/or conflicting aerial traffic and/or (2) to effect timely maneuvers to avoid collisions based on visual- or sensor-detected proximity to such conflicting aerial traffic.

As the role of UAS platforms expanded, an issue that had to be addressed was the growing potential for these platforms to be involved in serious safety-related incidents, including near and actual midair collisions between UAS platforms and other UAS platforms and/or conventional aircraft operating in close proximity to one another in both controlled and uncontrolled airspace environments.

Traffic detection and avoidance problems present themselves all too frequently in areas of heavy UAS deployment such as, for example, in military missions flown in forward theaters of operation. These problems were understood to present a significant drawback to expanding UAS deployment that was envisioned to fulfill growing military, law enforcement and other specific aerial surveillance and monitoring requirements in areas of otherwise operating aerial traffic. Expansion of UAS operations in the United States, for example, was initially inhibited by lack of a common understanding regarding what was required to safely and routinely operate a UAS in the National Airspace System (NAS). Challenges such as the lack of an onboard pilot to see and avoid other aircraft and the wide variation in unmanned aircraft missions and capabilities needed to be addressed in order to fully integrate UAS operations in the NAS and in other controlled and uncontrolled airspace worldwide. Employment scenarios had to be studied that included, but were not limited to, border patrol surveillance, rural aerial law enforcement surveillance, and myriad commercial uses such as, for example, pipeline monitoring, and deconfliction of these efforts from routine manned commercial, military and general aviation aircraft had to be established. Use of UAS platforms in law enforcement, homeland security and such commercial applications was evaluated as promising to prove fruitful if certain identified shortfalls in the UAS platforms that were available could be overcome.

Efforts were undertaken to, for example, incorporate and demonstrate an assured level of Collision Avoidance (CA) in the UAS platforms. The U.S. Federal Aviation Administration (FAA), for example, levied a requirement that UAS platforms must have a demonstrable CA capability with an Equivalent Level Of Safety (ELOS) to a manned aircraft before being certified to fly in the NAS. In order to meet this requirement, substantial investment was made to support research into UAS-based, i.e., "on aircraft," CA technologies. A variety of sensors and/or sensor arrays were considered that were conventionally employed to detect, track and/or report information regarding manned aerial traffic, including myriad active and passive sensors to self-detect conflicting aerial traffic. It was recognized that those systems had been developed to augment, or to be augmented by, a specific aircrew's ability to see-and-avoid proximate conflicting aerial traffic. It was also recognized that extensive communication capabilities were incorporated into manned aircraft in order that traffic separation may be implemented by communication with ground-based and/or airborne radar or other sensor capable facilities.

While the above-described sensor and communication capabilities, as they were developed for manned aircraft, were understood to support man-in-the-loop CA, they were not originally considered as being effective in providing CA for UAS platforms. In fact, it was understood that there were distinct differences between capabilities that manage aerial traffic in the NAS providing "traffic separation" and those that may be employed for assuring CA. CA, as it was understood at the time that initial introduction of UAS platforms into the NAS was being considered, was ultimately left, in the case of manned aerial vehicles, to the aircrew operating those aerial vehicles. It is this distinction between traffic separation and CA that formed the basis levied by the FAA for the requirement for an ELOS in the employment of a UAS in the NAS.

It was recognized that, when the individual aircrew, or man-in-the-loop, was removed from the system in the transition from a manned aircraft to a UAS, the ability of the aircrew to see-and-avoid conflicting aerial traffic was removed. The see-and-avoid capability, therefore, was replaced in UAS platforms by a Sense-and-Avoid (SAA) capability. Such a capability was developed and made increasingly robust so as to be responsive enough to detect conflicting aerial traffic and analyze the potential for conflict. The analysis was required to be quick and accurate enough (1) to provide cues to a remote operator of the UAS to initiate evasive maneuvers, or (2) to provide command guidance to the UAS such that the UAS would autonomously initiate such evasive maneuvers in response to the command guidance.

These initial difficulties inhibiting broader UAS employment have been largely addressed such that the use and operation of conventional larger UAS platforms is well understood and regulated. These larger UAS platforms incorporate systems such as, for example: (1) UAS-based radar detection and transmission systems; (2) other UAS-based systems that can detect and fuse information from aircraft transponder and/or airframe-mounted traffic alert and collision avoidance systems (TCAS), particularly those including transponder mode S and/or automatic dependent surveillance-broadcast (ADS-B) capabilities; (3) precise geo-location capabilities; (4) optical technologies via airframe mounted camera systems, to include low-light level and infra-red capabilities; and (5) acoustic and/or laser ranging systems, to support CA in further support of integration of the systems into the NAS. These are all viable options, which are employed in varying combinations to address SAA concerns and effective aerial traffic deconfliction for larger UAS platforms.

The same systems and rules do not translate, however, to enabling the use of widespread employment of commercially-available sUAS platforms. sUAS platforms, and the intricacies of their incorporation into a broader array of operational scenarios in the NAS, have been largely overlooked. As indicated above, sUAS platforms represent some amount of a regression to earlier UAS considerations that were never effectively addressed. Their smaller size, inherent lack of technical capabilities regarding communications, and limited payload, all of which are considerations in maintaining a low cost profile in procurement and operation, reintroduce difficulties in that any onboard-mounted system may not only stress the SWAP considerations for the UAS based on the carriage of the system alone, but may further stress the SWAP considerations by requiring additional system support components to perform rudimentary system sensor fusion, and data formatting and transmission capacity for even raw sensor data.

SUMMARY OF THE DISCLOSED SUBJECT MATTER

In response to the lack of any meaningful consideration given to facilitating the integration of sUAS platforms into the NAS, it would be advantageous to provide systems and methods by which to implement a certain minimum, or otherwise acceptable, level of situational awareness and communications capabilities to reduce risk and assist in the safe integration of the sUAS platforms in the NAS.

It would be further advantageous to provide a specific response to concerns voiced by the FAA and other agencies regarding strategic management of sUAS platforms, including a need for better communication between interested parties and the operator of a particular sUAS in real time.

The solution should consider the capabilities of the sUAS in a systems context that includes the aerial vehicle (with its associated payload); one or more remote human operators; and a command, control and communications (C3) system for communication with, and operation of, the aerial vehicle by the one or more remote human operators. The C3 system associated with each sUAS provides the essential hub with which communications may be established to a number of beneficial purposes.

Since the early 1990s, the FAA has been accommodating UAS operations in the NAS on a case by case basis. In recent years, the number of requests to fly UAS platforms in the NAS has risen significantly, with public operations alone increasing by over 900% between 2004 and 2013. The unique capabilities and significant benefits that sUAS platforms are capable of delivering contribute to an increased operational demand by public and civil operators.

Commercial opportunities and uses of sUAS platforms are attractive on many levels, but primarily due to their lower cost of ownership and operation when compared to conventional airplanes and helicopters. These low exploitation costs also permit their use in areas where aircraft may not have been considered to represent a cost effective technology, such as agricultural sensing and surveying on small scale.

In the FAA Modernization and Reform Act of 2012, Congress mandated that the Secretary of Transportation publish a final rule on allowing sUAS employment in the NAS) by mid-2014 with the intent of providing safe integration of all civil UAS platforms by late-2015.

Exemplary embodiments of the systems and methods according to this disclosure may provide a unique capability to support an objective of accommodating safe integration of expanding operations for sUAS platforms seamlessly in the NAS.

Exemplary embodiments may provide a specifically-tailored service that addresses the above-enumerated concerns with an understanding that products and services that are easily accommodated in larger UASs cannot be feasibly employed in a broad array of sUAS platforms due to their limited payload capabilities and the low cost nature of the market.

Exemplary embodiments may provide systems and methods that are uniquely configured to address a change of paradigm from aircraft-based avionics and capabilities to a ground-based solution centered on, for example, a mobile ground control electronic station that may be typically employed to manage a sUAS mission and/or flight.

Exemplary embodiments may integrate appropriate software, server and system components into an interactive, easy-to-use, web-based tool (such as ARINC's proprietary Web Aircraft Situation Display (WebASD$^{SM}$) and OpCenter) that provides stakeholders with real-time, graphical flight-following information. Exemplary embodiments may employ the integrated software, server and system components to acquire position information regarding an sUAS platform from the control console for the sUAS platform.

Exemplary embodiment may forward the acquired position information to a separate server that can augment and provide graphical display (WebASD$^{SM}$ and other graphical products) of the sUAS intended route of flight (flight planned route). The actual position of the sUAS may be received from the sUAS via its ground-based control console and automatically updated on the remote display substantially in real-time. In embodiments, the acquired position information for the sUAS may be converted to a format commonly used by aviation and air traffic control systems, such as, for example, into a pseudo ADS-B (FANS 1/A like) track message to share with other systems, including FAA/ATC systems.

Exemplary embodiments may provide interested parties, via some interactive user interface including a graphical display or a Graphical User Interface (GUI) to interact with the sUAS operator at the sUAS control console using two way text-like messaging directly with the sUAS control console. This capability will provide more timely information to and from the sUAS operator to enhance safety and reduce conflicts with operations of the sUAS.

Exemplary embodiments may enhance the locational situation awareness for the sUAS operator through the integration of a text messaging capability that can be used to effect real-time communications with the sUAS operator that is directly in control of the sUAS.

Exemplary embodiments may centrally archive relevant data in order to provide a non-real time reporting capability for mission reconstruction and process evaluation, particularly in an event of a conflict arising between operation of a particular sUAS and other aerial assets.

Exemplary embodiments may be used to display an sUAS mission, e.g., projected flight plan and/or route, and to track and display the actual real-time location of the sUAS as it operates to a plurality of interested and participating agencies in an easy-to-follow format that is integrated with the existing display capabilities of the interested and participating agencies.

Exemplary embodiments may address the lack of any currently-available system and/or technology for tracking and real-time visualization of a location of an sUAS or for communications between interested parties and an sUAS operator. The interested parties may include, for example, agencies overseeing an area in which one or more sUAS platforms are being operated, potentially by more than one operating entity or agency, to de-conflict sUAS operations from each other, from other aerial vehicle operations and/or from other events that may be occurring in the area, which could hazard, or be hazarded by, sUAS operations. For example, if an instance arises in which an FAA Air Traffic Controller wishes to advise a sUAS operator regarding an authorized sUAS mission or a requirement to keep an sUAS clear of a specific block of airspace of specific geographic location due to an immediate, emergent and/or unforeseen event, there is conventionally no means by which to do so in a timely manner. The FAA Air Traffic Controller must relay information to the sUAS operator using conventional landline or cellular phone, which may not be answered directly by the sUAS operator.

Exemplary embodiments may provide a capability for interested parties, including DHS, DOJ, FAA, local law enforcement agencies and commercial sUAS operators, to monitor the sUAS missions in real time as well as to provide a mechanism for these interested parties to communicate directly with an operator of a specific sUAS using text messaging products that are currently deployed for conventional aircraft operations.

Exemplary embodiments may leverage use of available low-cost communications and tracking technologies, which may be integrated with existing systems currently in use for commercial aircraft, to provide cost effective capabilities for the sUAS operator and a significant increase in the situational awareness to airspace operators and other interested parties in a manner that would significantly assist in the integration of the sUAS in the NAS.

These and other features and advantages of the disclosed systems and methods are described in, or apparent from, the following detailed description of various exemplary embodiments.

BRIEF DESCRIPTION OF THE DRAWINGS

Various exemplary embodiments of the disclosed systems and methods for implementing substantially real-time data communications and text messaging to provide interested parties with an ability to more effectively communicate with an operator of an sUAS during system operations, will be described, in detail, with reference to the following drawings, in which.

DESCRIPTION OF THE DISCLOSED EMBODIMENTS

Figure 1:
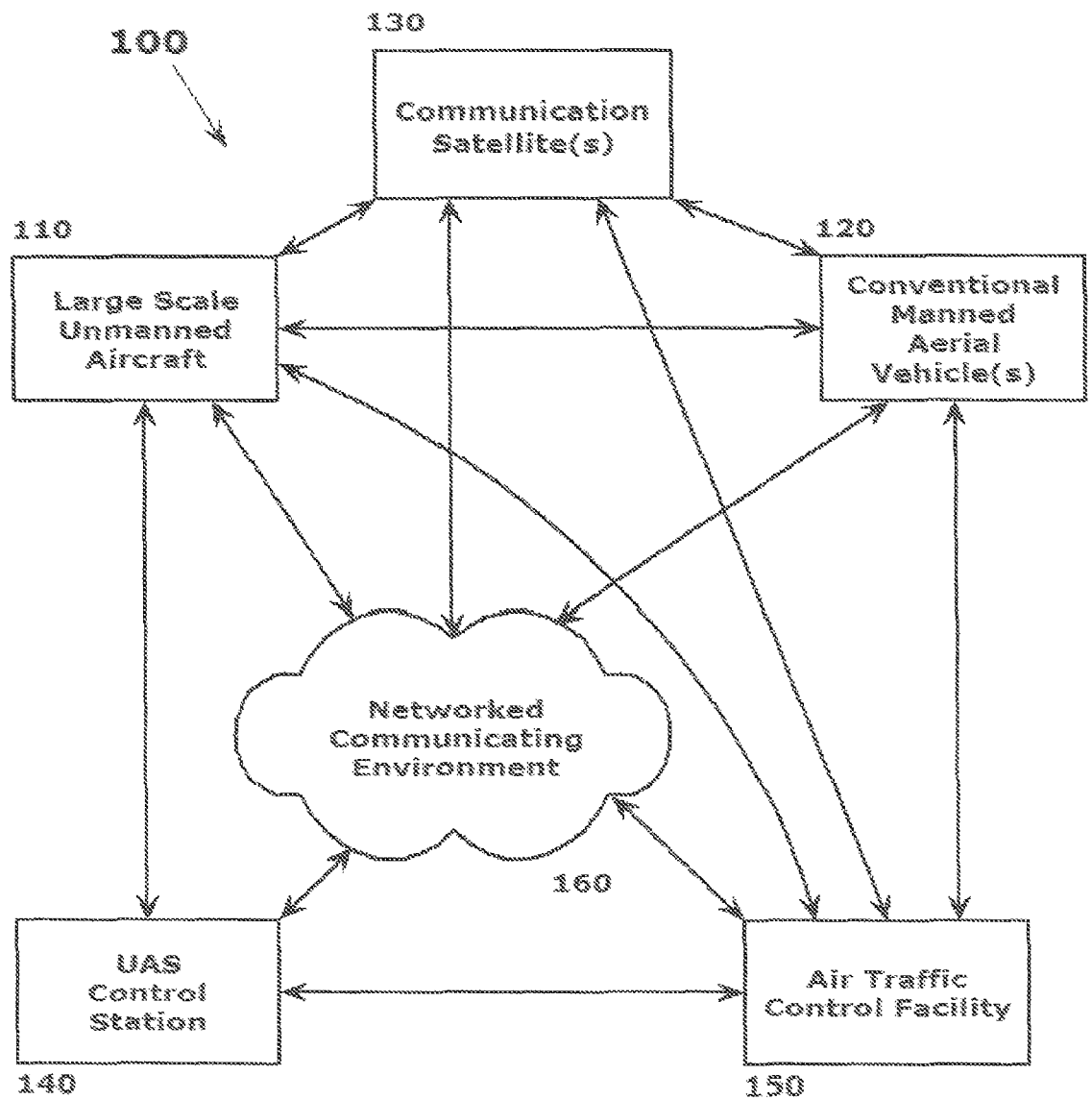
FIG. 1 illustrates an exemplary embodiment of a network environment in which a large scale UAS may be operated for deconfliction with other conventional aerial traffic.

The disclosed systems and methods for implementing substantially real-time data communications and text messaging to provide interested parties with an ability to more effectively communicate with an operator of a Small Unmanned Aircraft System (sUAS) during system operations will generally refer to these specific utilities for those systems and methods. Exemplary embodiments described and depicted in this disclosure should not be interpreted as being specifically limited to any particular configuration of an sUAS including any particular small unmanned aircraft or aerial platform, or any particular cooperating control station by which an operator provides command, control and communication (C3) services with respect to operation of the small unmanned aircraft or aerial platform. Any advantageous use of an interactive communication system for integrating real-time, or near-real-time, information regarding a position and operations of one or more sUAS platforms to provide situational awareness regarding other activities in a vicinity of the one or more aUAS platforms in a recognizable format depending on user agency preference and to provide a streamlined communication mechanism directly to the sUAS operator regarding potential conflicts with those other activities in support of strategice integration of sUAS operations in a controlled or uncontrolled airspace environment is contemplated.

Specific reference to, for example, any particular sUAS component and/or any particular communication capability presented in this disclosure should be understood as being exemplary only, and not limiting, in any manner, to any particular class of sUASs as that term is defined above, or to any communication link. The systems and methods according to this disclosure will be described as being particularly adaptable to employment scenarios for, and configurations of, sUASs in which the aerial vehicles are flown by an operator with a cooperating control console, the operator having visual contact with the aerial platform for substantially all of a flight duration. These references are meant to be illustrative only in providing a single real-world utility for the disclosed systems and methods, and should not be considered as limiting the disclosed systems and methods.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

FIG. 1 illustrates an exemplary embodiment 100 of a network environment in which a large scale UAS may be operated for deconfliction with other conventional aerial traffic. For context, the depiction represented in FIG. 1 may be considered generally applicable to the current implementation of a command, control and communication scheme for integrating "large" UAS operation for UAS platforms greater than 55 pounds in a current or next generation architecture that relies heavily on UAS based communications equipment relaying location information directly to the ground based FAA infrastructure. For example, the FAA has proposed that ADS-B will likely be a mandatory equipment requirement. More broadly, the FAA has described how large scale UAS platforms may be integrated into the NAS and the regulations regarding communications. These schemes apply technology that relies heavily on conventional aircraft avionic technology that is limitedly adapted for use in a larger UAS, but that is is not fit for sUAS adaptation due to size and cost.

FIG. 1 broadly depicts an integration scheme as outlined in the FAA document "Integrating UAS in The NAS—Ops Concept," dated Sep. 28, 2012, which highlights the elements proposed as necessary in order to "strategically manage" large UASs in the NAS.

As shown in FIG. 1, a large scale unmanned aircraft 110 may be operated from a dedicated and corresponding UAS control station 140. The UAS control station 140 is likely part of a fixed, or semi-fixed, unit, potentially large in size and extensive in sophistication that itself includes significant communication capabilities itself. Communication and control links may be direct, between the large scale unmanned aircraft 110 and the corresponding UAS control station. Otherwise, these communications may be extended through a networked communicating environment 160 and one or more communication satellites 130. Currently-available communications equipment may afford the large scale unmanned aircraft 110 and/or the UAS control station 140 to communicate with other conventional manned aerial vehicles 120 operated in a vicinity of the large scale unmanned aircraft 110. In the manner depicted in FIG. 1, not only do the conventional manned aerial vehicles communicate directly with the various air traffic control facilities 150 in the NAS architecture, but the UAS control stations 140 and the large scale unmanned aircraft 110 may communicate directly with the air traffic control facilities 150 as well. Robust systems architectures and infrastructures exist, which are supplemented by commercial providers including, for example ARINC, to fulfill strategic implementation and integration goals for the large scale unmanned aircraft 110 in the NAS.

Figure 2:
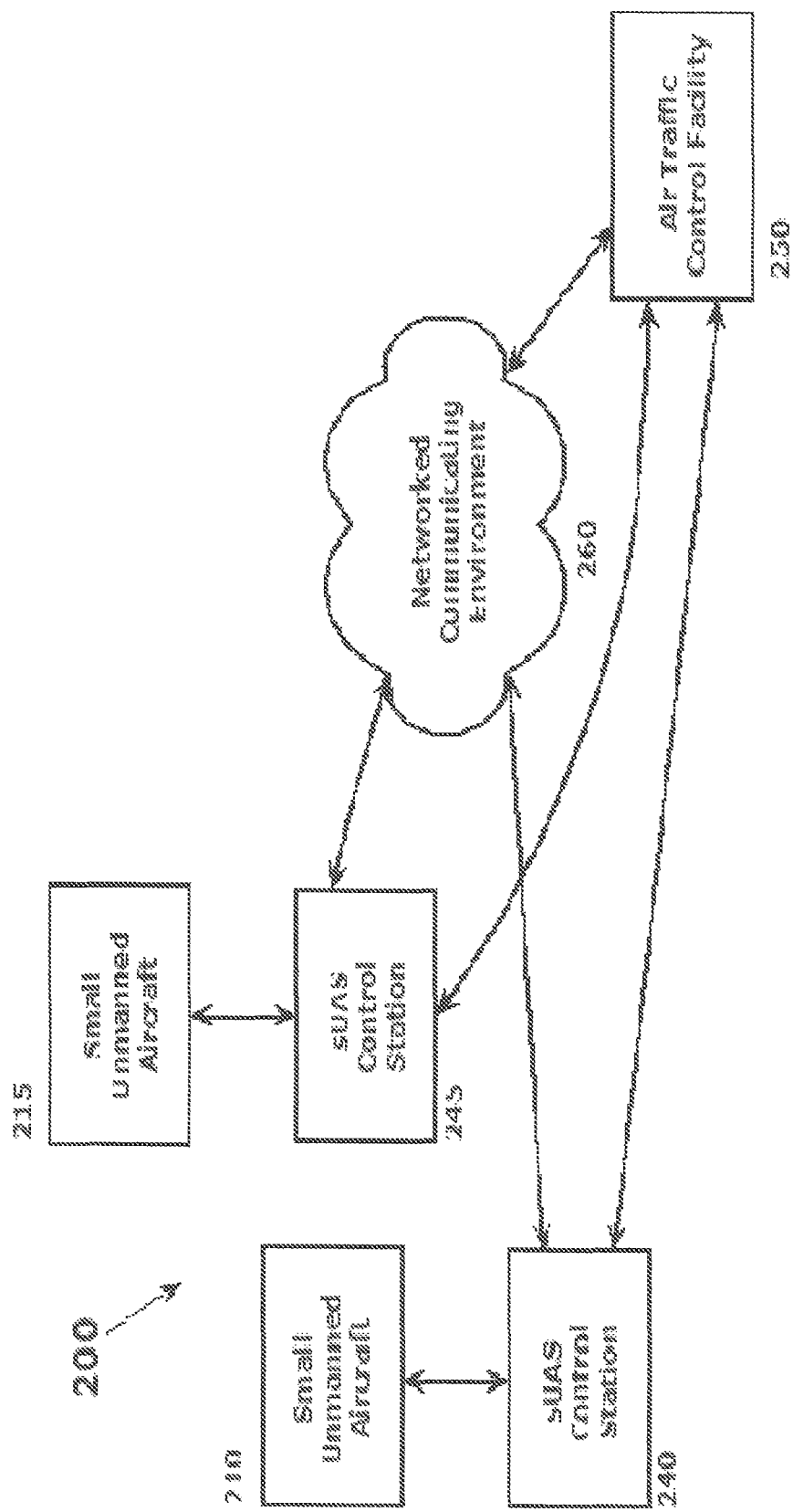
FIG. 2 illustrates an exemplary embodiment of an overview of an sUAS command and control network environment in which remote monitoring for mission tracking and mission data acquisition, and real-time data communication and messaging, may be implemented according to this disclosure.

FIG. 2 illustrates an exemplary embodiment 200 of an overview of an sUAS command and control network environment in which remote monitoring for mission tracking and mission data acquisition, and real-time data communication and messaging, may be implemented according to this disclosure. The known solutions that provide robust schemes for integration of large scale unmanned aircraft are strictly limited in the context of any applicability to sUAS implementation. The operational concepts applicable to the system depicted in FIG. 1 overlook, and otherwise do not address any notions regarding sUAS and make no specific recommendations for like strategic integration of sUAS platforms and operations in the NAS. The disclosed scheme, as broadly depicted in FIG. 2 addresses this current shortfall.

As shown in FIG. 2, an exemplary command, control and communication structure is proposed that accounts for the configuration of sUAS platforms and concepts regarding their intended employment. One or more small unmanned aircraft 210,215 may be operated by a cooperating sUAS control station 240,245. The sUAS control station may preferably be operated by an operator that maintains line of sight visualization of the small unmanned aircraft 210,215 during flight. Currently commercial operations of sUAS platforms, such as the small unmanned aircraft 210,215, are limited by FAA regulations. sUAS platforms are those small unmanned aircraft weighing less than 55 pounds. sUAS platforms, according to current operating limitations, can only be operated outside of controlled airspace, in line of sight to the operator, during daylight hours, below 400 feet above ground level (AGL), and must be authorized by an FAA (Certificate Of Authorization—COA)

The sUAS control station 240,245 may typically be comprised of a portable computing device in the form of a mobile ground station and/or laptop computer. The sUAS control station 240,245 may enable a radio link for implementing two-way data communications between the small unmanned aircraft 210,215 and the respective corresponding sUAS control station (portable computing device) 240,245. Tactical operating stations and conventional radio transmitters may also and separately be used to fly small unmanned aircraft 210,215 dynamically.

Where large scale unmanned aircraft are more complex and typically carry multiple communications devices and avionics, such as ADS-B transmitters and transponders (with associated power and antenna systems), the small unmanned aircraft 210,215 payload typically includes a ground station communications link enabling line of sight wireless communication between the small unmanned aircraft 210,215 and the respective corresponding sUAS control station (portable computing device) 240,245. The small unmanned aircraft 210,215 may also carry various lightweight sensor packages, such as, for example, cameras and environmental sensors. The small unmanned aircraft 210,215 may pass sensor information and positioning to the respective corresponding sUAS control station 240,245. In embodiments, position information for the small unmanned aircraft 210,215 may be by way of a miniature global positioning satellite (GPS) system receiver mounted on the small unmanned aircraft 210,215.

Communication may be established between the one or more sUAS control stations 240,245 and one or more cooperating entities represented in FIG. 2 by air traffic control facility 250. These communications may be direct from the sUAS control stations 240,245 and the air traffic control facility 250, or otherwise may be via some networked communicating environment 260. The networked communicating environment 260 may include other agencies or entities that may collect and process data from the sUAS control stations 240,245. Alternatively, the networked communicating environment 260 may include one or more sUAS servers as will be discussed in more detail with reference to FIG. 3 below.

Figure 3:
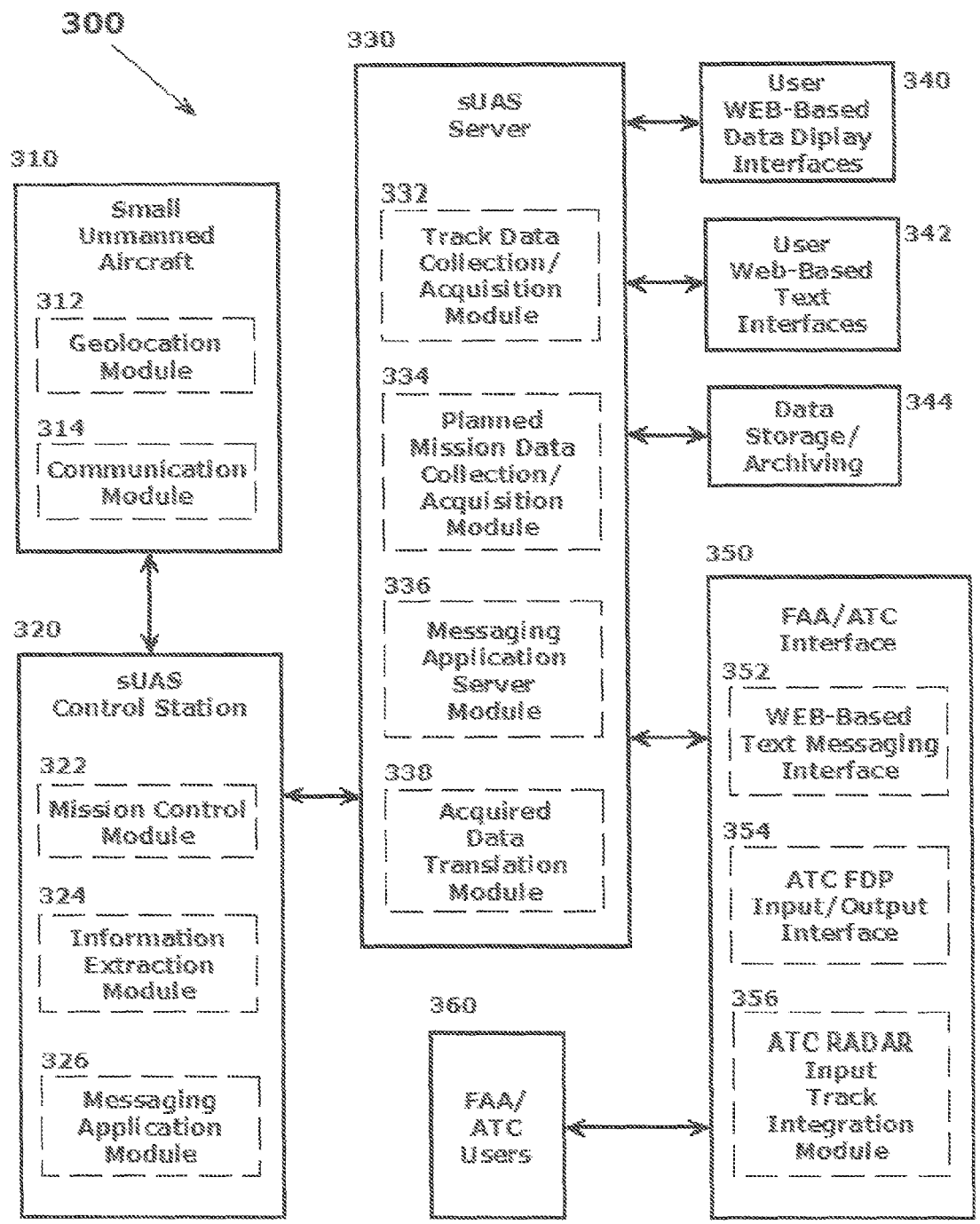
FIG. 3 illustrates an exemplary system 300 that is operable as a more detailed sUAS command and control network environment in which remote monitoring for mission tracking and mission data acquisition, and real-time data communication and messaging, may be implemented according to this disclosure.

FIG. 3 illustrates an exemplary system 300 that is operable as a more detailed sUAS command and control network environment in which remote monitoring for mission tracking and mission data acquisition, and real-time data communication and messaging, may be implemented according to this disclosure. As shown in FIG. 3, individual system components may be programmed to cooperatively provide the following capabilities:

Ground controller based track acquisition application (or application programming interface (API) or interface control/requirements document (ICD/IRD));

Mission and/or flight plan extractor (or API or ICD/IRD);

Host- and/or server-based sUAS information (tracks and missions) repository and location conversion (pseudo ADS-B tracks);

Graphical situation display for planned mission and real-time locations; and

Integrated messaging capability.

The exemplary system 300 may include a small unmanned aircraft 310 that carries one or more sensors. The small unmanned aircraft 310 may include a geolocation module 312 that may provide positioning information for the small unmanned aircraft 310 to the sUAS control station 320. Sensor and positioning information may be transmitted from the small unmanned aircraft 310 to the sUAS control station 320 via one or more communication module(s) 314, which may include a radio transceiver.

The exemplary system 300 may include a core system capability that enables the exemplary system 300 to share real-time information with remote entities/user agencies. This core system capability may be implemented by one or more software modules resident on the sUAS control station 320. The one or more software modules may include a mission control module 322, an information extraction module 324 and a messaging application module 326. The information extraction module 324 may, for example, listen to communications between the small unmanned aircraft 310 and the mission control module 322 of the sUAS control station 320. The information extraction module 324 may convert the positional information for the small unmanned aircraft 310 and communicate the converted positional information to an sUAS (track) server 330.

Alternatively, an API may be supplied to the sUAS control station manufacturer in order that the API may integrate the positional information and mission waypoint data sharing directly into their application. As well as the positional information, the application may also capture mission and/or flight plan data and forward the mission legs to the sUAS server 330. Protocols currently prototyped include MAVLINK 1.0 and UAVLINK. Except for configuration, this application may require no user interaction and may execute as a background application entirely. At the discretion of the sUAS operator, communications between this application in the sUAS control station 320 and the sUAS server 330 may be monitored. The application, resident on the sUAS control station 320, may communicate with the sUAS server 330, which may be remote from any one or more of the sUAS control stations 320, via any available communication link, including and particularly any available internet connection.

The application may be configured as a strictly background task running on the sUAS control station 320, including on the information extraction module 324, to provide a conduit for transmitting position information constantly, or otherwise according to a prescribed time interval which may be preferably set at nominally 10 seconds, from the small unmanned aircraft 310 to a tracked data collection acquisition module 332 in the sUAS server. The position information may or may not be displayed on a display screen of the sUAS control station 320 for monitoring by the sUAS operator.

Essentially, the sUAS control station 320 information extraction module 324 or background data capture application has two basic functions: (1) extracting mission and/or flight plan including waypoint information and sending this information to a planned mission data collection/acquisition module 334 in an sUAS server 330 for each mission; and (2) constantly monitoring and capturing real-time position information sent from the small unmanned aircraft 310 to the sUAS control station 320 for formatting and relaying to the track data collection/acquisition module 332 of the sUAS server 330.

The track and/or position information communicated by the information extraction module 324 or the background data capture application of the sUAS control station 320 to the to the track data collection/acquisition module 332 of the sUAS server 330 may include, preferably in a format similar to an ADS-C periodic position report, at a minimum: (1) sUAS identification; (2) report time and date; (3) current Latitude/Longitude and altitude; and (4) GPS status and/or fix quality, when used.

The planned mission and/or waypoint information communicated by the information extraction module 324 or the background data capture application of the sUAS control station 320 to the to the planned mission data collection/acquisition module 334 of the sUAS server 330 may include, at a minimum: (1) sUAS identification; (2) start point Latitude/Longitude and altitude (likely zero); (3) track waypoint number, Latitude/Longitude, and planned altitude at the waypoint; (4) a number of waypoints; and an end point Latitude/Longitude and altitude (likely zero). It is envisioned that the start point and end point locations may typically be the same.

The sUAS server 330 may act as a data collection/acquisition control point for collecting information on planned tracks and actual real-time position for a plurality of small unmanned aircraft 310 as provided to the sUAS server 330 by an sUAS control station 320 associated with each small unmanned aircraft 310. Individual modules may be provided to facilitate the data collection/acquisition functions in the sUAS server 330. The sUAS server 330 may integrally include or may be otherwise connected to a storage unit for data storage/archiving 344. The sUAS server 330 may include one or more acquired data translation modules 338 that may be used, for example to translate the acquired data for each sUAS into a format that is typically used in air traffic control facilities such as, for example, conversion to pseudo ADS-B tracks.

The sUAS server 330 may include modules for executing several functional capabilities. These may include a track data collection/acquisition module 332 and a planned mission data collection/acquisition module 334 for processing track and mission data from the one or more sUAS control stations 320. A data storage device may be associated with the sUAS server 330 for track and mission data storage/archiving 344, which may be used to support a report generating capability. An acquired data translation module 338 may be provided for data format conversion, which may be used to facilitate track and mission data forwarding in a manner that pre-formats the information to be in a form that may be accommodated by end user systems. A messaging application server module 336 may be provided to act as a text messaging gateway and for storage and archiving of the text messaging.

The sUAS server 330 communicates with each sUAS control station 320 information extraction module 324 as a track and mission information extractor application (or API), the data storage/archiving 344 server and end users and systems over a highly reliable and secure communications link, such as, for example, IP—GlobaLink. The end users and systems may include air traffic control facilities via FAA/ATC interface(s) 350, and user WEB-based data display interfaces 340 and user WEB-based text interfaces 342.

Many widely dispersed user WEB-based data display interfaces 340 may provide an ability to graphically view sUAS locations in near real-time overlaid on a depiction of the planned route and/or mission to provide enhanced situational awareness for interested parties. An enhanced WebASD$^{SM}$ product is proposed as a suitable situation display for sUAS users and interested parties. Other technologies, such as Google Earth® could also be exploited as a tracking display, but may lack the integration of other aircraft that are flying and thus may be of limited value to certain of the interested parties. As indicated above positions may be updated every ten seconds via a refresh mode in the sUAS server 330. The attractiveness of a product such as webASD$^{SM}$ is the capability of integrating the position or track display of one or all sUAS platforms with all other know aircraft as well as flight-related information such as weather phenomena, to provide a real airspace situation picture.

An FAA/ATC interface 350 may be provided in communication with the sUAS server 330 for facilitating communications with the FAA/ATC users 360. The FAA/ATC interface 350 may include individual operating modules: a dedicated WEB-based text messaging interface 352; an air traffic control flight data processing (ATC FDP) input/output interface 354; and an ATC RADAR track integration module 356. Civil Aviation Authorities worldwide employ integrated RADAR and various other synthetic position display technologies in order to view situation information to safely manage conventional aircraft traffic. While sUAS operators have obtained prior FAA approval in order to fly each mission, ATC is unable to determine the actual location of sUAS activity or to accurately predict where sUAS platforms are intended to be operated at any given time. In order to facilitate more sUAS activity, the FAA/ATC interface 350 may advantageously integrate multiple sUAS missions and subsequent real-time tracking of sUAS platform locations received via the ATC FDP input/output interface 354 through operation of an ATC RADAR input track integration module 356.

Situational or graphic displays depicting real-time location and intended routes may be achieved and integrated in several different ways to satisfy different user requirements or to be integrated into specific existing technologies. Methods of providing an integrated graphical display may include differing strategies.

Conversion of sUAS track info may be undertaken to provide the information in a format and protocol that can be ingested into existing and future FAA ATC systems. A pseudo/simplified ADS (A,B or C—FANS 1/A) message architecture may be appropriate. Appropriate consideration may be given to alleviating the potential for misunderstanding. As indicated in the background discussion above, it should be understood that, while the generated and displayed sUAS position information is suitable for situational awareness, it may not provide suitable separation assurance.

The sUAS mission and position information may be converted to an ADS-B type message by the sUAS server 330. The sUAS mission and position information may be delivered to FAA/ATC users 360 (and FAA RADAR processor systems) via the ATC FDP input/output interface 354 as an integrated input for display on existing controller display units (CDU). This would eliminate extra hardware needed to display sUAS traffic and missions and would seamlessly integrate with the display of actual real-time air traffic on the CDU. ATC decisions could be made after reflecting on an integrated picture. In order to facilitate this integration, the sUAS mission and position information may be generated, for example, by an ATC RADAR input track integration module 356 in the FAA/ATC interface 350 with which the sUAS server 330 communicates.

Conversion of sUAS track and mission profiles may be undertaken specifically to provide information in a format and protocol that can be integrated into existing air situation products, such as ARINC's proprietary WebASD$^{SM}$. Existing air situation products are implemented to currently acquire FAA RADAR information in near real-time and to supplement the FAA RADAR information with position report information. These products may provide highly configurable graphical aircraft situation displays and integrated real-time aircraft traffic pictures to registered users. The sUAS server 330 may format sUAS position information and forward formatted information messages to the existing air situation product, which would in turn provide users with an overall depiction of actual air traffic, including an sUAS of interest.

Conversion of sUAS track and mission profiles may be undertaken to provide the information in a format and protocol that may be received by and integrated into Web-based mapping applications, such as Google Earth® or Microsoft Virtual Earth®. In these applications, the sUAS server 330 may generate appropriate XML files that enable third party mapping applications to receive and display mission and position information. This enables the situational display as described above on virtually any device including mobile devices such as smartphones, iPhones®, tablet computers, iPads®, PDAs and the like.

There are times that Direct Controller Pilot Communications (DCPC) are critical and necessary to the safe and efficient conduct of aircraft operations. Currently, there are no defined standards for sUAS communications and these communications are typically accomplished using telephones, which may require further passing of information to the actual sUAS operator of interest. As shown in FIG. 3, each of the sUAS control station 320 (with a messaging application module 326), sUAS server 330 (with a messaging application server module 336), and the FAA/ATC interface 350 (with a Web-based text messaging interface 352) may constitute an integrated system for near real-time communication among the participating entities. Additionally, user Web-based text interfaces 342 may be provided in order that all end users may participate in the text messaging network as appropriate.

The above-identified communicating components are envisioned to provide for secure and assured integrated text messaging to appropriate registered users and sUAS operators by incorporating an appropriate messaging product or service into the sUAS architecture shown in FIG. 3. Messaging tools may be tailored to avail the interested parties and sUAS operators of a messaging capability that is on par with the messaging functionality available in commercial aviation today using ACARS like messaging on, for example, an advanced integrated communication link network. A message display window may be provided on a workstation used by any interested party, including on the sUAS control stations 320, to display a message window on a situation display. The message window may allow users to send immediate text messages to specified user recipients including sUAS operators. A message may appear on the sUAS control station 320 indicating a new message has been received. The sUAS operator may also initiate messages on the sUAS control station to be forwarded to appropriate registered recipients.

According to the above construct, the disclosed systems and methods may realize the following benefits in support of strategic integration of sUAS platforms in a controlled manner in the NAS.

Real-time direct messaging communications may be facilitated between an sUAS operator and one or more remote users, including Air Traffic Controllers, mission coordinators, and the like, via an sUAS control station operated by the sUAS operator. These sUAS communications may support the concept of two-way communication between sUAS operators and remote users or systems.

The sUAS control station may be supplemented with software that implements communications with the sUAS platform using various protocols, e.g., MAVLink, over various communication methods, e.g., Wi-Fi, 900 MHz and the like.

sUAS communications between an sUAS control station and other components in a networked communicating environment, including with an sUAS server as shown in FIG. 3, may use commercially-available networks, such as cellular, satellite, Wi-Fi with cellular backhaul, or a combination of the above. sUAS control station communications to the sUAS server may employ HTTP/HTTPS over TCP/IP, or Short Message Service (SMS), protocols.

The sUAS control station may extract relevant information from the airborne platform and output the information to the sUAS server in a predefined format. It may be appropriate to use an intermediate communications software connector to manage communications between the sUAS control station and the sUAS server for occasions in which the primary sUAS server software may experiences a communications loss, or to provide additional store and forward or message assurance requirements.

The sUAS control station may have the capability of producing a rudimentary flight plan, or list of waypoints. The sUAS control station may send this "flight plan" along with the associated aircraft identifier to the sUAS server for integration and display. Real-time position information received from the airborne platform by the sUAS control station may be acquired and sent to the sUAS server to include, at a minimum, aircraft identifier, latitude/longitude, altitude, heading, and ground speed information.

The sUAS server, upon receiving the flight plan and subsequent position reports from the sUAS control station using, for example, a Web service or other method, may store the information in a database for mapping, reporting, and archival purposes.

The sUAS server, upon receiving a flight plan from an sUAS control station, may make the flight plan available for display on a mapping display at the appropriate time. For example, when receiving a flight plan for a future flight, it may be stored until the active time of the flight covered by the flight plan. Regardless of this flight plan function, upon the start of flight, the sUAS control station may begin transmitting position information to the sUAS server and the sUAS server may display the information on a mapping display based upon at least a set of predetermined set of rules and/or protocols. The position information from the sUAS control station may be provided as an overlay to various map types employed by FAA/ATC facilities or that may be commercially available for use by myriad interested parties.

Beyond immediate mapping functions, the sUAS server may be provided with an ability to translate flight plan and position reports from the sUAS control station into multiple formats compatible with ATC or other systems. The display product is are intended to be delivered to the interested parties in a format that is compatible with systems used by the interested parties.

The sUAS server may store the flight plans and position reports in a database for a predetermined length of time after the flight for historical reporting and analysis purposes.

All of the various components of the exemplary system 300, as depicted in FIG. 3, may be connected internally, and to each other via combinations of wired and wireless communications to facilitate data, messaging and control exchange between the various interested parties operating the various components.

It should be appreciated that, although depicted in FIG. 3 as a series of separate discrete units with specific operating functionalities, the various disclosed elements of the exemplary system 300 may be arranged in any combination of sub-systems as individual components or combinations of components. In other words, no specific configuration is to be implied by the depiction in FIG. 3. Further, although depicted as individual units for ease of understanding of the details provided in this disclosure regarding the exemplary system 300, it should be understood that the described functions of any of the individually-depicted components may be undertaken, for example, by one or more processors within, connected to, and/or in communication with the system components.

Figure 4:
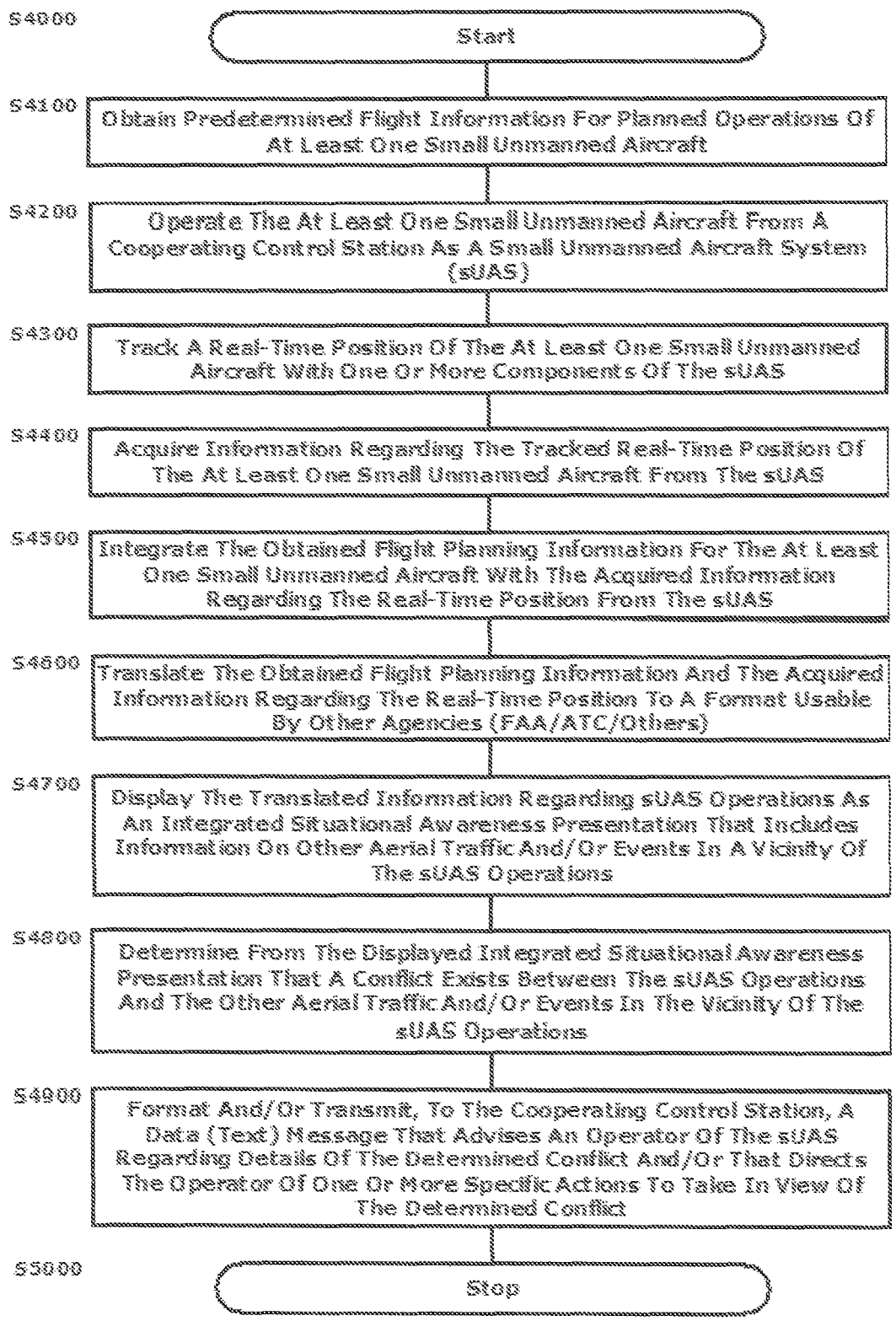
FIG. 4 illustrates a flowchart of an exemplary method for for effecting remote monitoring for mission tracking and mission data acquisition, and real-time data communication and messaging, between an sUAS operator command and control console and one or more remote interested agencies entities or operators according to this disclosure.

The disclosed embodiments may include an exemplary method for effecting remote monitoring for mission tracking and mission data acquisition, and real-time data communication and messaging, between an sUAS operator command and control console and one or more remote interested agencies entities or operators. FIG. 4 illustrates and exemplary flowchart of such a method. As shown in FIG. 4, operation of the method commences at Step S4000 and proceeds to Step S4100.

In Step S4100, predetermined flight information, i.e., a flight plan, may be obtained regarding planned operations of at least one small unmanned aircraft at, for example, an sUAS control station. Operation of the method proceeds to Step S4200.

In Step S4200, the at least one small unmanned aircraft may be operated from the sUAS control station to execute the flight plan. Operation of the method proceeds to Step S4300.

In Step S4300, a real-time position of the at least one small unmanned aircraft may be tracked by the sUAS control station. Operation of the method proceeds to Step S4400.

In Step S4400, information may be extracted regarding the track real-time position of the at least one small unmanned aircraft in the sUAS control station. Operation of the method proceeds to Step S4500

In Step S4500, the obtained flight planning information for the at least one small unmanned aircraft and the acquired information regarding the real-time position of the at least one small unmanned aircraft may be integrated by, for example, an sUAS server after being transmitted to the sUAS server from the sUAS control station. Use of the sUAS control server may be appropriate in that it reduces required computing overhead from the one or more sUAS control stations with which the sUAS server communicates. Operation of the method proceeds to Step S4600.

In Step S4600, the individual components of the obtained flight planning information and the acquired information regarding the real-time position of the at least one unmanned aircraft, or otherwise, the integrated information that represents a combination of these two components, may be translated by an appropriate application, algorithm or scheme in the sUAS server in order to provide to other users, and/or interested parties, information regarding sUAS operations in a manner that is usable by the users and/or interested parties according to their system specifics and display protocols. Operation of the method proceeds to Step S4700.

In Step S4700, a the translated information regarding sUAS operations may be displayed as a portion of an integrated situational awareness presentation that includes information, for example, on other aerial traffic, and/or other events, in a vicinity of sUAS operations. Operation of the method proceeds to Step S4800.

In Step S4800, it may be determined from the displayed integrated situational awareness presentation of the conflict has arisen between the displayed sUAS operations and the other aerial traffic and/or the other events in the vicinity of the sUAS operations Operation of the proceeds to Step S4900.

In Step S4900, a data (text) message may be formatted in or transmitted to the sUAS control station controlling the operations of the sUAS aerial platform with which a conflict has arisen. The data (text) message may advise the sUAS operator in, for example, a pop-up window on the display of the sUAS control station of the details of the potential, or actual, conflict with the operator's sUAS operations. The data (text) message may otherwise provide direction to the sUAS operator regarding immediate, and specific actions to be taken in order to remove the conflict. These actions may include direction to land the sUAS platform and cease further sUAS operations in the involved area for some specified period. Operation of the method proceeds to Step S5000, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating environments in which the subject matter of this disclosure may be implemented for familiarity and ease of understanding. Although not required, embodiments of the disclosed systems, and implementations of the disclosed methods, may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks or implement particular data types in support of the overall objective of the systems and methods according to this disclosure.

Those skilled in the art will appreciate that other embodiments of the disclosed subject matter may be practiced in integrating operations of sUAS platforms and operations in the NAS using many and widely varied system components.

As indicated above, embodiments within the scope of this disclosure may also include computer-readable media having stored computer-executable instructions or data structures that can be accessed, read and executed by one or more processors in differing devices, as described. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps of the above-outlined exemplary method. The exemplary depicted steps may be executed in any reasonable order to effect the objectives of the disclosed embodiments. No particular order to the disclosed steps of the method is necessarily implied by the depiction in FIG. 4, except where execution of a particular method step is a necessary precondition to execution of any other method step.

Although the above description may contain specific details, they should not be construed as limiting the claims in any way. Other configurations of the described embodiments of the disclosed systems and methods are part of the scope of this disclosure. It will be appreciated that various of the above-disclosed and other features and functions, or alternatives thereof, may be desirably combined into many other different systems or applications. Although the above description may contain specific details, they should not be construed as limiting the claims in any way. Other configurations are part of the scope of the disclosed embodiments. For example, the principles of the disclosed embodiments may be applied to each individual user, sUAS operator and interested party, where each user may individually employ components of the disclosed system. This enables each user to enjoy the benefits of the disclosed embodiments even if any one of the large number of possible applications do not need some portion of the described functionality. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

We claim:

1. A system for communicating regarding small unmanned aircraft flight operations, comprising:
   an information extraction module associated with a control station for the small unmanned aircraft that extracts information regarding a geographic position for the small unmanned aircraft and forwards the information regarding the geographic position for the small unmanned aircraft substantially in real time from the control station;
   a control station messaging module associated with the control station by which an operator controlling the flight operations of the small unmanned aircraft sends and receives formatted messages to and from interested parties concerned with flight operations of the small unmanned aircraft, the formatted messages being displayed on a display screen of the control station;
   an aircraft information server that is programmed to receive the information regarding the geographic position for the small unmanned aircraft, to translate the received information to a format that is used by the interested parties, and to transmit the translated information to the interested parties for display; and
   an aircraft information server messaging module that transfers the formatted messages between the control station for the small unmanned aircraft and the interested parties.

2. The system of claim 1, further comprising a remote messaging module associated with a display device operated by at least one of the interested parties by which the at least one of the interested parties sends and receive formatted messages to and from the operator controlling the flight operations of the small unmanned aircraft, the formatted messages being displayed on a display screen of the display device.

3. The system of claim 2, the display device being one of a smartphone, a tablet computer, a notebook computer or a laptop computer.

4. The system of claim 2, interested party formatted messages being sent to the control station for the small unmanned aircraft via the aircraft information server messaging module.

5. The system of claim 2, the display device displaying at least one of pre-flight planning information regarding an intended route of flight and information regarding the geographic position for the small unmanned aircraft to provide the at least one of the interested parties with a situational awareness display regarding the flight operations of small unmanned aircraft,
   wherein, when a conflict is determined to exist with the flight operations of the small unmanned aircraft based on the situational awareness display, a conflict message is generated to advise the operator controlling the flight operations of the small unmanned aircraft of the conflict.

6. The system of claim 5, the conflict message including instructions directing the operator controlling the flight operations of the small unmanned aircraft of actions to take to avoid the conflict.

7. The system of claim 6, the conflict message directing the operator controlling the flight operations of the small unmanned aircraft of actions to cease the flight operations.

8. The system of claim 6, the at least one of the interested parties being an air traffic control facility, the aircraft information server translating the information regarding the geographic position for the small unmanned aircraft to a format for direct integration into air traffic control systems used by the air traffic control facility,
   the air traffic control system determining that the conflict exists with the flight operations of the small unmanned aircraft and generating the conflict message to advise the operator controlling the flight operations of the small unmanned aircraft of the conflict.

9. The system of claim 1, the formatted message being one of a text message or an SMS message.

10. The system of claim 1, communications between the control station messaging module and the aircraft information server messaging module being exchanged over an internet connection.

11. A method for communicating regarding small unmanned aircraft flight operations, comprising:
    providing information regarding a geographic position for the small unmanned aircraft substantially in real time from a control station;
    sending formatted text content messages via a control station messaging module in the control station to interested parties concerned with flight operations of the small unmanned aircraft as a supplement to the information regarding the geographic position for the small unmanned aircraft, the sent formatted messages being displayed on a display screen of the control station; and
    receiving formatted text content messages from remote messaging modules of the interested parties, the received formatted messages being displayed on the display screen of the control station.

12. The method of claim 11, sent and received formatted text content messages being relayed through an aircraft information server messaging module in an aircraft information server that is programmed to receive the information regarding the geographic position for the small unmanned aircraft, to translate the received information to a format that is used by the interested parties, and to transmit the translated information to the interested parties for display.

13. The method of claim 11, at least one of the remote messaging modules being associated with a display device operated by at least one of the interested parties by which the at least one of the interested parties sends and receives formatted messages to and from the operator controlling the flight operations of the small unmanned aircraft, the interested party formatted messages being displayed on a display screen of the display device.

14. The method of claim 13, the display device being one of a smartphone, a tablet computer, a notebook computer or a laptop computer.

15. The method of claim 13, the interested party formatted messages being sent to the control station for the small unmanned aircraft via an aircraft information server messaging module.

16. The method of claim 13, further comprising displaying on the display screen of the display device at least one of pre-flight planning information regarding an intended route of flight and information regarding the geographic position for the small unmanned aircraft to provide the at least one of the interested parties with a situational awareness display regarding the flight operations of small unmanned aircraft.

17. The method of claim 16, further comprising:
determining that a conflict exists with the flight operations of the small unmanned aircraft based on the situational awareness display; and
generating a conflict message with the display device to advise the operator controlling the flight operations of the small unmanned aircraft of the existence of the conflict.

18. The method of claim 17, the conflict message including instructions directing the operator controlling the flight operations of the small unmanned aircraft of actions to take to avoid the existing conflict.

19. The method of claim 18, the conflict message directing the operator controlling the flight operations of the small unmanned aircraft of actions to cease the flight operations.

20. The method of claim 17, the at least one of the interested parties being an air traffic control facility, the aircraft information server translating the information regarding the geographic position for the small unmanned aircraft to a format for direct integration into air traffic control systems used by the air traffic control facility,
the air traffic control system determining that the conflict exists with the flight operations of the small unmanned aircraft and generating the conflict message to advise the operator controlling the flight operations of the small unmanned aircraft of the conflict.

21. The method of claim 11, the formatted message being one of a text message or an SMS message.

22. The method of claim 11, communications between the control station messaging module and the aircraft information server messaging module being exchanged over an internet connection.

23. A non-transitory computer readable medium on which is stored operating instructions that, when executed by a processor, cause the processor to execute the steps of method for communicating regarding small unmanned aircraft flight operations, the method comprising:
providing information regarding a geographic position for the small unmanned aircraft substantially in real time from a control station;
sending formatted text content messages via a control station messaging module in the control station to interested parties concerned with flight operations of the small unmanned aircraft as a supplement to the information regarding the geographic position for the small unmanned aircraft, the sent formatted messages being displayed on a display screen of the control station; and
receiving formatted text content messages from remote messaging modules of the interested parties, the received formatted messages being displayed on the display screen of the control station.

* * * * *